United States Patent
Hall et al.

(10) Patent No.: US 10,036,119 B1
(45) Date of Patent: Jul. 31, 2018

(54) THIMBLE ASSEMBLY FOR A CORD

(71) Applicants: David R. Hall, Provo, UT (US); Daniel Madsen, Vineyard, UT (US); Benjamin Taylor, Provo, UT (US); Joe Fox, Spanish Fork, UT (US); Lloyd J. Wilson, Herriman, UT (US)

(72) Inventors: David R. Hall, Provo, UT (US); Daniel Madsen, Vineyard, UT (US); Benjamin Taylor, Provo, UT (US); Joe Fox, Spanish Fork, UT (US); Lloyd J. Wilson, Herriman, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 15/496,476

(22) Filed: Apr. 25, 2017

(51) Int. Cl.
| | |
|---|---|
| *F16G 11/12* | (2006.01) |
| *D07B 1/14* | (2006.01) |
| *D07B 1/00* | (2006.01) |
| *D07B 1/02* | (2006.01) |
| *D07B 1/06* | (2006.01) |

(52) U.S. Cl.
CPC ............. *D07B 1/145* (2013.01); *D07B 1/005* (2013.01); *D07B 1/02* (2013.01); *D07B 1/06* (2013.01); *F16G 11/12* (2013.01)

(58) Field of Classification Search
CPC ........ F16G 11/12; F16G 11/14; F16G 11/143; F16G 15/10; F16G 17/00; F16G 15/04; F16G 15/06
See application file for complete search history.

(56) References Cited

U.S. PATENT DOCUMENTS

| | | | | |
|---|---|---|---|---|
| 1,680,346 A | * | 8/1928 | Sunderland | ............. F16G 11/06 403/210 |
| 2,827,680 A | * | 3/1958 | Gibson | ................. F16G 11/048 403/210 |
| 4,036,101 A | * | 7/1977 | Burnett | ..................... D04C 1/12 294/74 |

(Continued)

OTHER PUBLICATIONS

VintageAviator (VA; NPL Article on Cable Splicing dated Oct. 15, 2014, see http://thevintageaviator.co.nz/reference/cable-splicing).*

*Primary Examiner* — Steven Lim
*Assistant Examiner* — Mancil Littlejohn, Jr.

(57) ABSTRACT

A thimble assembly that includes an arch portion connecting a first leg portion to a second leg portion. The thimble assembly may also include a peripheral groove extending substantially along an outer surface of the first and second leg portions and the arch portion. The thimble assembly may also include a plurality of connectors extending from a first lip of the peripheral groove and connecting to a second lip of the peripheral groove. The connectors may traverse the peripheral groove across the first and second leg portions and the arch portion. The thimble assembly may include a length of cord with a plurality of strands that traverses the peripheral groove. The strands may enclose the connectors such that the strands are woven around the connectors. In one embodiment, the thimble assembly may include a wireless tension detector connected to the thimble that includes a sensor that senses radial expansion and contraction of the cord under tension. The wireless tension detector may include an alert signal to indicate when expansion and contraction of the cord is not within a predetermined range.

13 Claims, 10 Drawing Sheets

(56) References Cited

U.S. PATENT DOCUMENTS

| | | | | |
|---|---|---|---|---|
| 4,398,336 A | * | 8/1983 | Beuch | F16G 11/146 24/115 A |
| 2012/0172927 A1 | * | 7/2012 | Campbell | A61B 17/0057 606/213 |
| 2015/0316921 A1 | * | 11/2015 | Atherton | G05B 19/4065 700/114 |

* cited by examiner

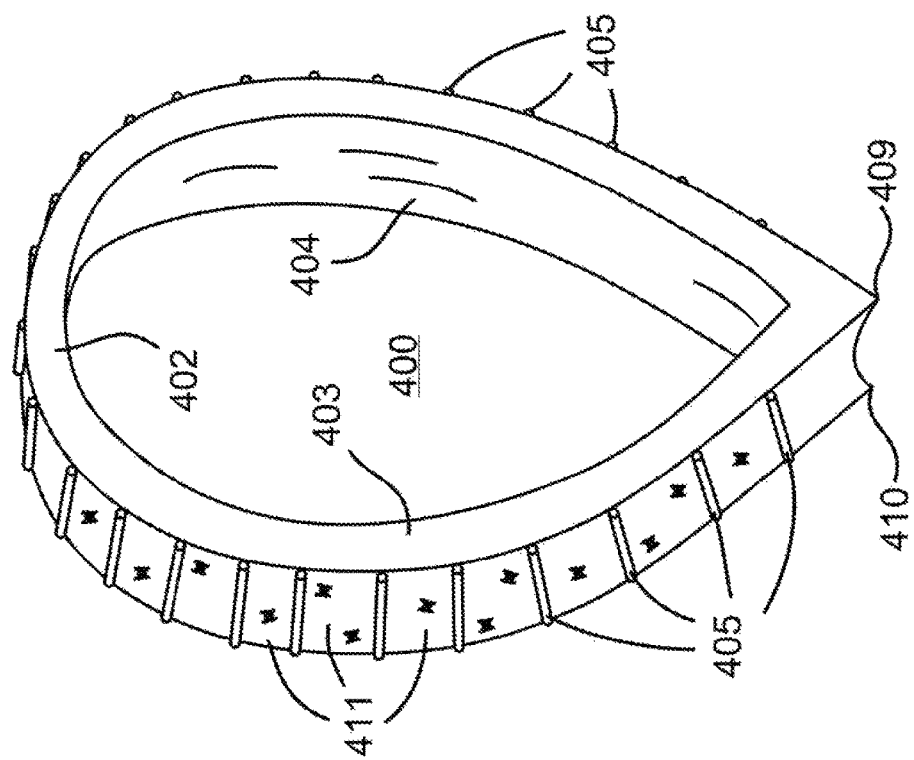
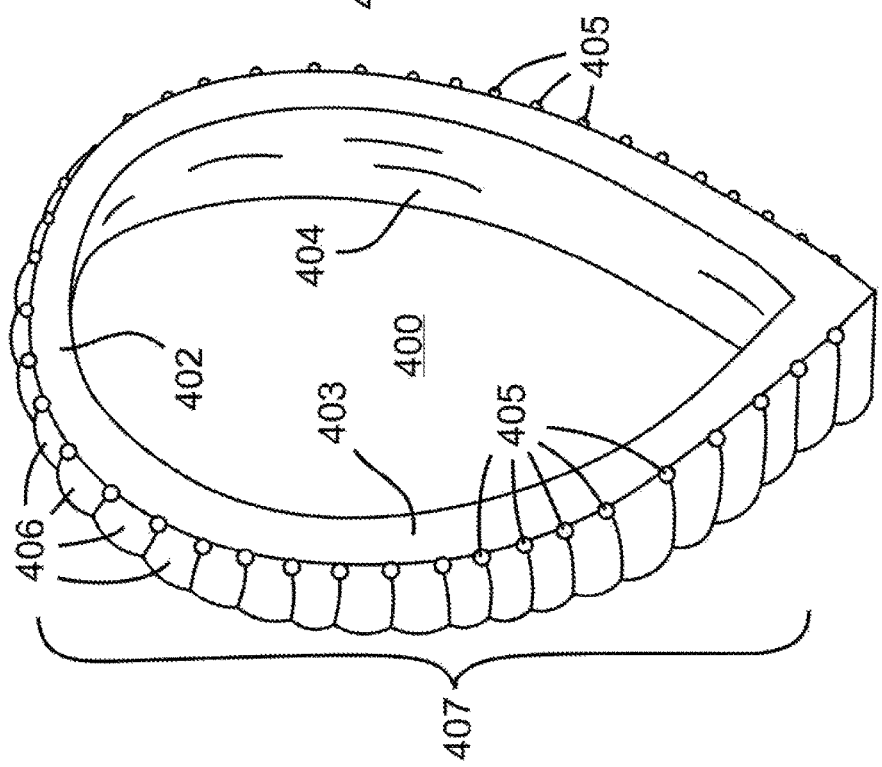
FIG. 4B
FIG. 4A

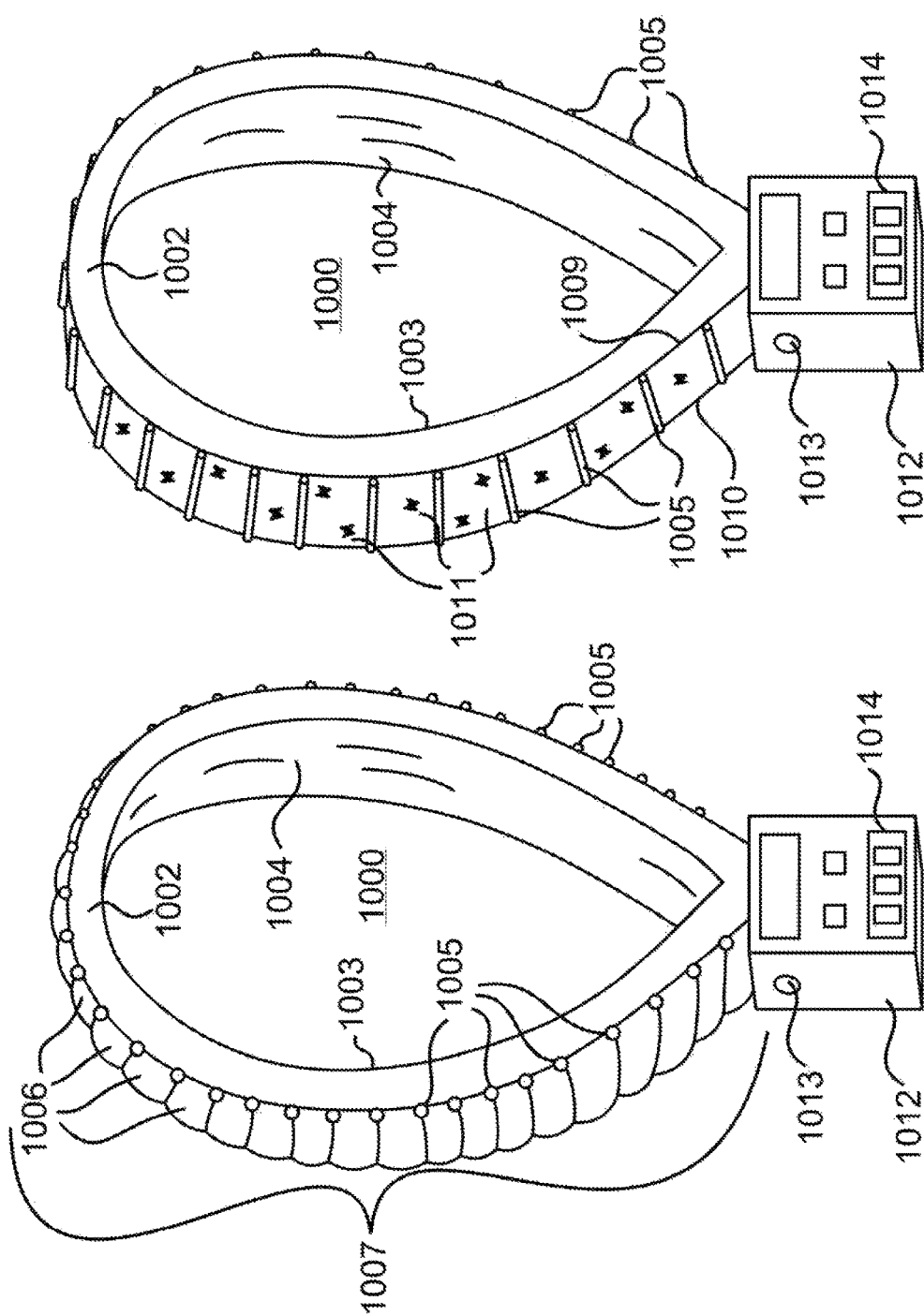

THIMBLE ASSEMBLY FOR A CORD

TECHNICAL FIELD

The present disclosure relates generally to the field of cordage. More specifically, the present disclosure relates to an improved thimble assembly for a cord.

BACKGROUND

Rope-type cordage is often used in environments where it is desirable to transmit high tensile forces to move things such as elevator cars, elements, of cranes, draglines, and other lifting or pulling devices. In many of these applications, the rope terminates in a loop, with the loose end being secured back onto the main rope. Fittings or other securement systems are often used to secure the loose end of the rope back onto the rest of the wire rope. Thimbles are commonly used to preserve the natural shape of the loop. Thimbles serve to prevent the rope loop from bending too tightly when loaded, and thus prevent pinching and abrading of the inner surface of the rope loop. A fastener often connects the rope loop and thimble to another object, such as an object to be lifted. Together, the loop and thimble form a thimble assembly.

Such thimble assemblies are often used in heavy-duty operations, and thus placed under great stresses and tension when in use. As a result, components of thimble assembly sometimes fail in the field, resulting in a load being dropped while being lifted. In addition, these practices can subject manufacturers to unwarranted liability. Thus, there remains a need for an improved thimble assembly that reduces the likelihood of the thimble failing.

SUMMARY OF THE INVENTION

The invention has been developed in response to the present state of the art and, in particular, in response to the problems and needs in the art that have not yet been fully solved by currently available thimble assemblies. Accordingly, a thimble assembly is disclosed herein that includes a plurality of barbs embedded into strands of cord and connectors enclosed by the strands such that the strands are woven around the connectors. The features and advantages of the invention will become more fully apparent from the following description and appended claims, or may be learned by practice of the invention as set forth hereinafter.

In a first embodiment of the invention, the thimble assembly includes an arch portion connecting a first leg portion to a second leg portion, and a peripheral groove extending substantially along an outer surface of the first and second leg portions and the arch portion. The thimble assembly may also include a plurality of connectors extending from a first lip of the peripheral groove and connecting to a second lip of the peripheral groove. The connectors may traverse the peripheral groove across the first and second leg portions and the arch portion. The thimble assembly may include a length of cord with a plurality of strands that traverses the peripheral groove. The strands may enclose the connectors such that the strands are woven around the connectors.

In a second embodiment of the invention, the thimble assembly includes a wireless tension detector connected to the thimble, which includes a sensor that senses radial expansion and contraction of the cord under tension. The wireless tension detector may include an alert signal to indicate when expansion and contraction of the cord is not within a predetermined range.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which:

FIG. 4A is an isometric view of an embodiment of a thimble assembly;

FIG. 4B is an isometric view of the thimble assembly of FIG. 4A with the cord removed;

FIG. 10A is an isometric view of a thimble assembly with a wireless tension detector, according to one embodiment; and FIG. 10B is an isometric view of the thimble assembly of FIG. 10A with the cord removed.

DETAILED DESCRIPTION

It will be readily understood that the components of the present invention, as generally described and illustrated in the Figures herein, may be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
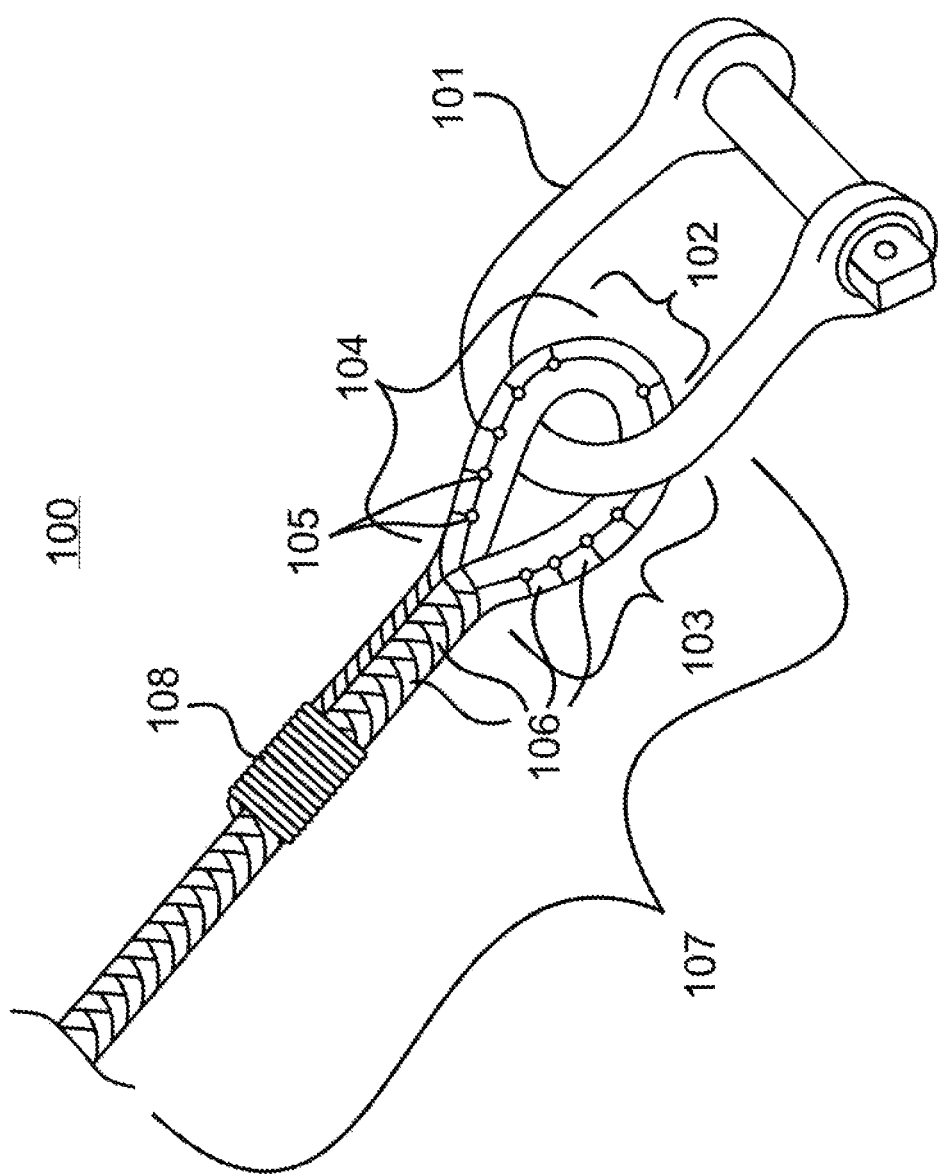
FIG. 1 depicts an embodiment of a thimble assembly connected to a shackle.

FIG. 1 depicts an embodiment of a thimble assembly 100 connected to a shackle 101. The thimble assembly 100 may include an arch portion 102 connecting a first leg portion 103 to a second leg portion 104. A plurality of connectors 105 enclosed by strands 106 of a length of cord 107, may traverse a peripheral groove that extends substantially along the first leg portion 103, the second leg portion 104, and the arch portion 102. The connectors 105 may extend from a first lip of the peripheral groove to a second lip of the peripheral groove. The strands 106 may be woven around the connectors 105, according to one embodiment. The cord 107 forms a loop, also known as a "rope eye," around the thimble assembly 100 by traversing the peripheral groove. According to the present embodiment, the loop may be closed using a splice 108 that forms a tight weaving around the end of the cord 107.

Figure 2:
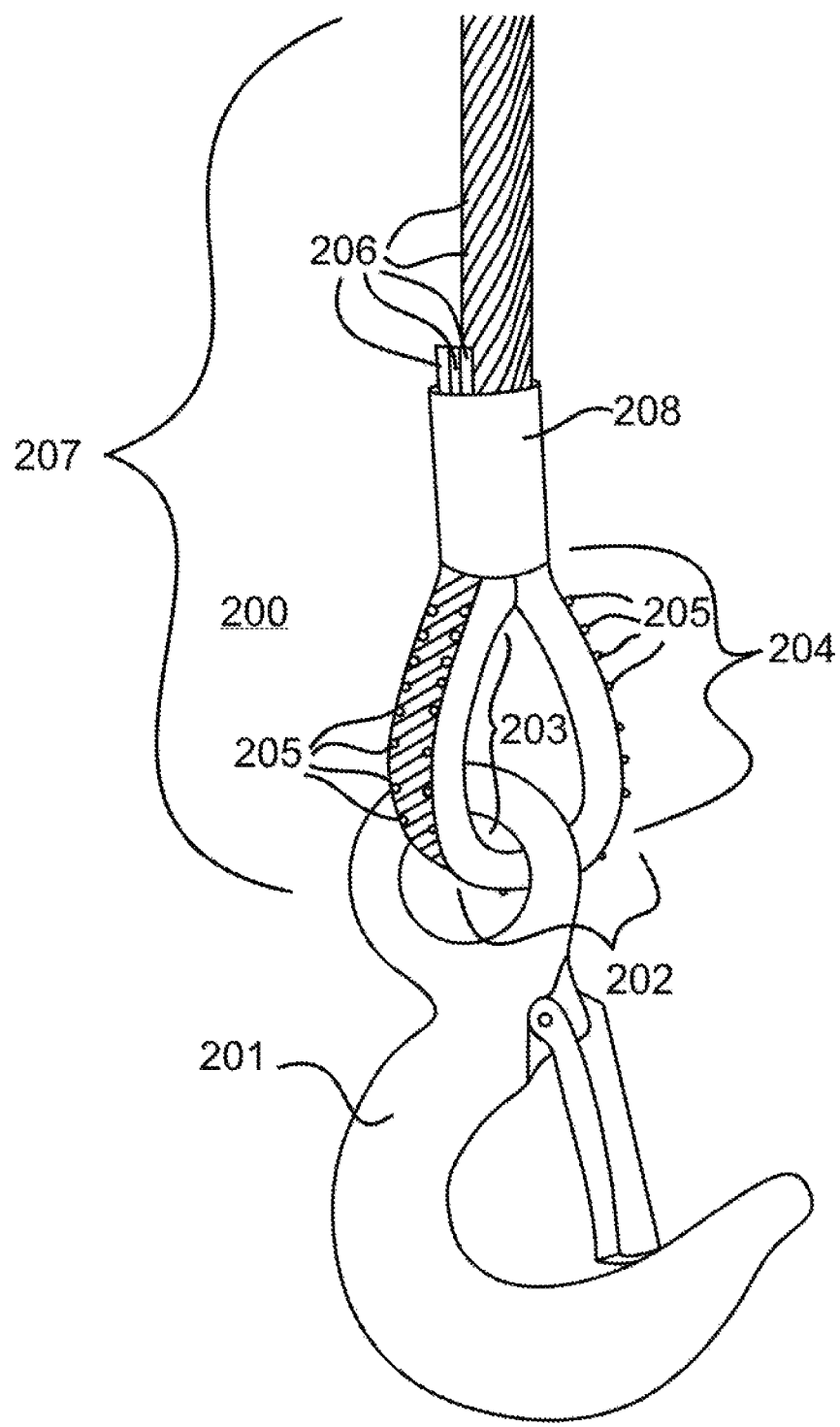
FIG. 2 is an isometric view of a thimble assembly, according to one embodiment.

FIG. 2 is an isometric view of a thimble assembly 200, according to one embodiment. The first leg portion 203, second leg portion 204 and arch portion 202 form a loop in the cord 207 that encloses a slip hook 201. The slip hook 201 may be installed into the thimble assembly 200 before the loop is closed off. The cord 207 may close off the loop using a ferrule 208 that connects to two halves of the loop together. The ferrule 208 may form a tight connection to the cord 207 if it is pinched using substantial force, or the ferrule 208 may include screws that may tighten around the strands 206 of the cord 207 using a hex key. The strands 206 are woven around connectors 205 that may provide stability should the ferrule 208 fail under pressure.

Figure 3:
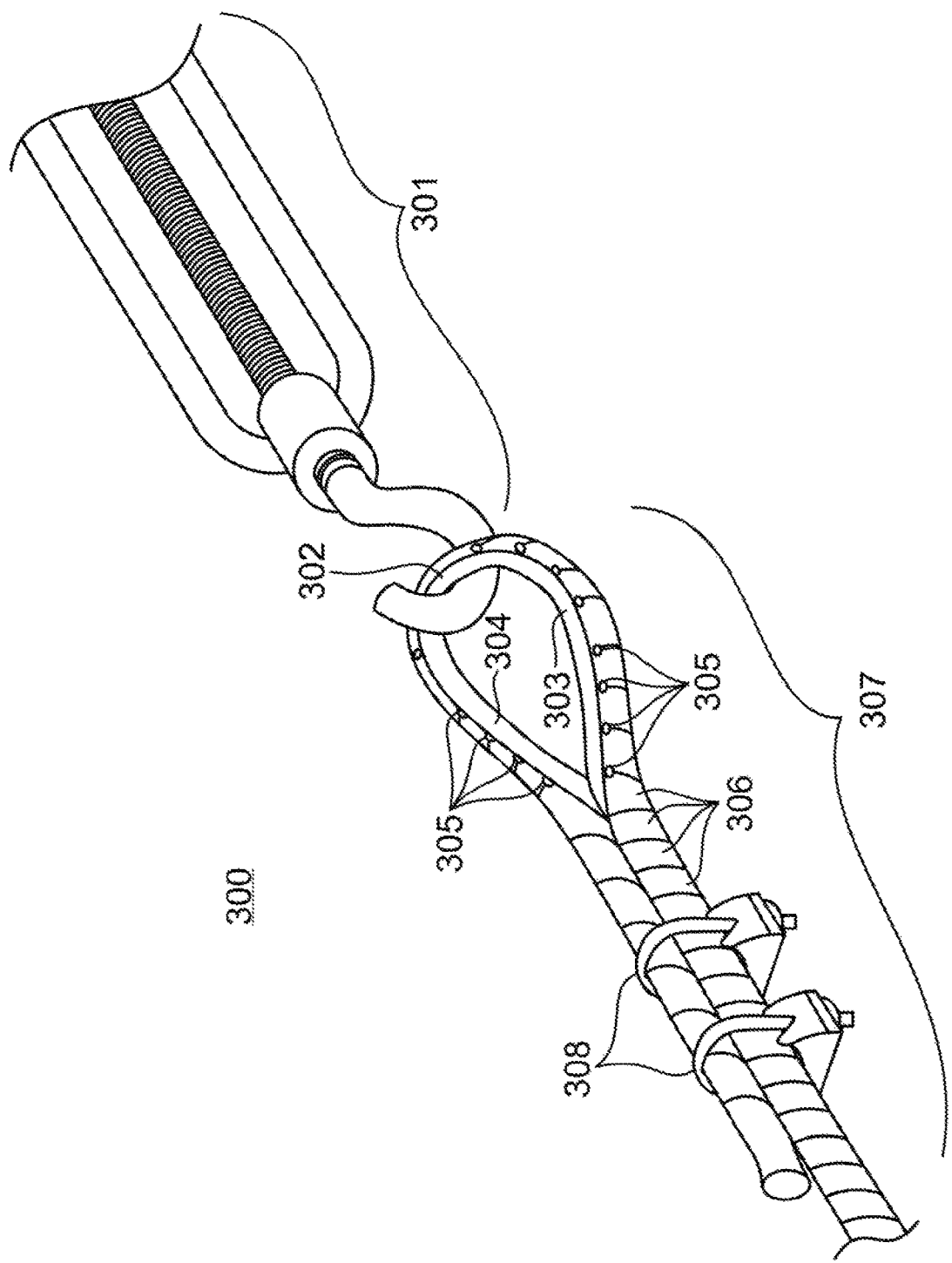
FIG. 3 is an isometric view of an embodiment of a thimble assembly.

FIG. 3 shows a thimble assembly 300, according to one embodiment, attached to a cable tensioner 301. A cord 307 is looped around a first leg portion 303, a second leg portion 304, and an arch portion 302 before being closed off by two u-bolt pipe clamps 308. Other attachment apparatus may be used to form the loop in the cord 307 such as sewn stitches that connect the two halves of the loop together. In another embodiment, the two loop halves may be braided and/or spliced together. An embodiment of the thimble assembly 300 may also include one or more bosses with bores through which fastening screws tighten the around the cord 307. Strands 306 are woven around connectors 305 for added support.

FIG. 4A is an isometric view of an embodiment of a thimble assembly 400. The cord 407 is cupped by the peripheral groove, which extends substantially along an outer surface of the arch portion 402 as well as the first leg portion 403 and second leg portion 404. The cord 407 includes a plurality of strands 406 that are woven around the connectors 405 and traverse the peripheral groove. In various embodiments, the cord 407 may include one or more materials such as hemp, linen, flax, cellulose, carbon, wool, hair, feathers, cotton, coir, jute, straw, silk, sisal, polymers, nylon, Dyneema®, Kevlar®, rayon, orlon, polypropylene, polyesters, polyethylene, aramids, acrylics, copper, iron, steel, stainless steel, bronze, nichrome, carbon, solder, titanium, zinc, silver, gold, tungsten, or aluminum. The strands 406 may refer to any suitable fiber, filament, thread, yarn, wire, or any other threadlike material.

FIG. 4B is an isometric view of the thimble assembly 400 of FIG. 4A with the cord (407 of FIG. 4A) removed. The thimble assembly 400 includes a plurality of connectors 405 extending from a first lip 409 of the peripheral groove and connecting to a second lip 410 of the peripheral groove. The connectors 405 traverse the peripheral groove across the first leg portion 403 and second leg portion 404 as well as the arch portion 402. The connectors 405 may, according to one embodiment, include metal fasteners through which individual strands (see 406 of FIG. 4A) of cord (see 407 of FIG. 4A) may traverse. The peripheral groove of the thimble assembly 400 may include a plurality of barbs 411. The barbs 411 may be embedded into the strands (see 406 of FIG. 4A) of cord (see 407 of FIG. 4A). In various embodiments, the barbs 411 may include anchoring wires to encircle the individual strands (see 406 of FIG. 4A). In one embodiment the connectors 405 and barbs 411 may provide support to the cord (see 406 of FIG. 4A) while lifting an object such that less pressure is being applied to a single connection point on the thimble assembly 400 and the pressure on the cord (see 407 of FIG. 4A) from lifting a load is dispersed among the connectors 405 and barbs 411.

Figure 5:
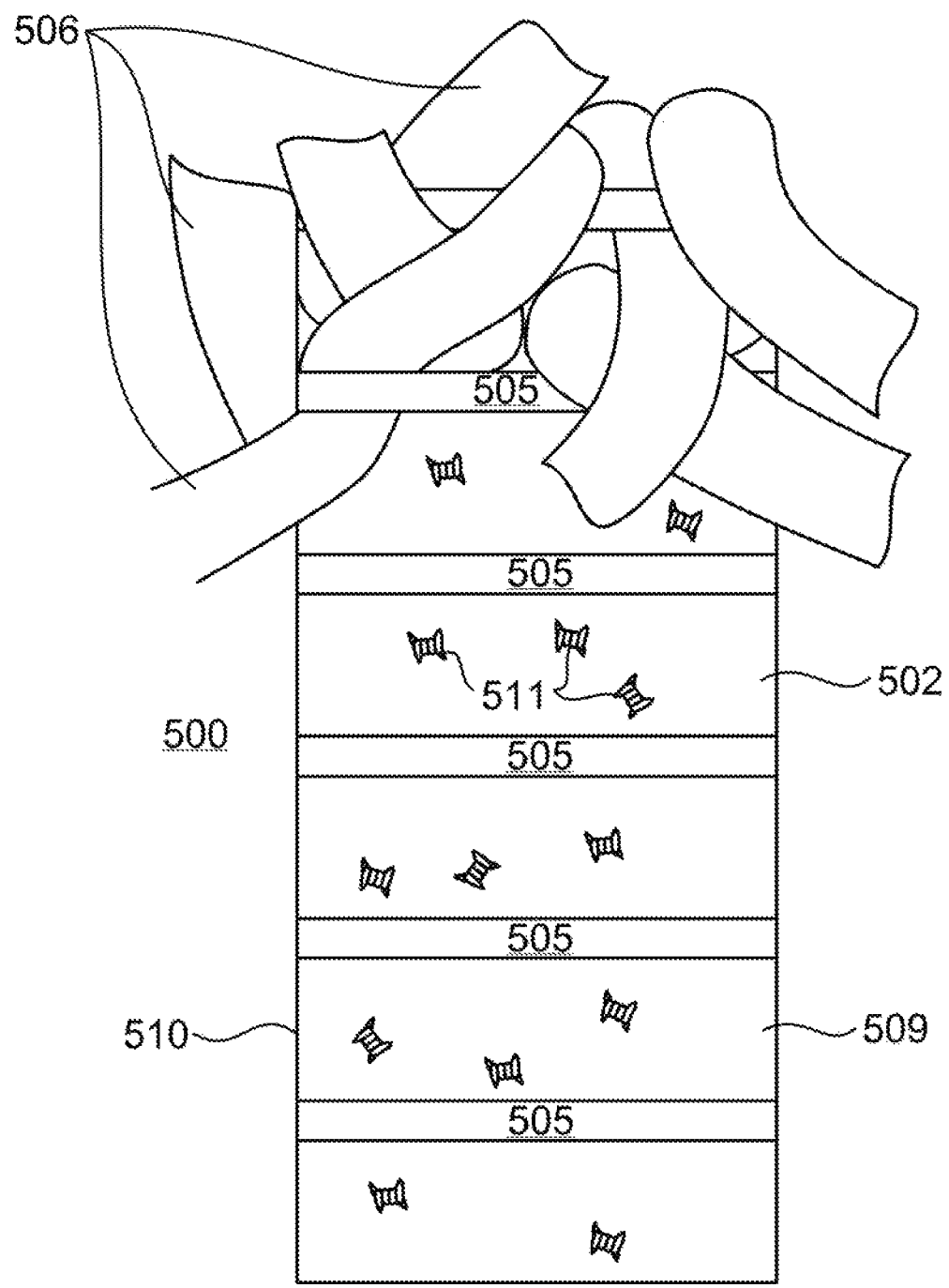
FIG. 5 is an isometric view of an arch portion of a thimble assembly, according to one embodiment.

FIG. 5 is an isometric view of an arch portion 502 of a thimble assembly 500, according to one embodiment. Individual strands 506 are partially woven around the connectors 505 that extend from a first lip 509 to a second lip 510. The strands 506 may eventually enclose the connectors 505 to assist in distributing the pressure such that less pressure is applied to whatever connection apparatus is used to connect the two halves of the loop together. Barbs 511 may catch on the threads of the strands 506 to help secure the strands' 506 position in the peripheral groove.

Figure 6:
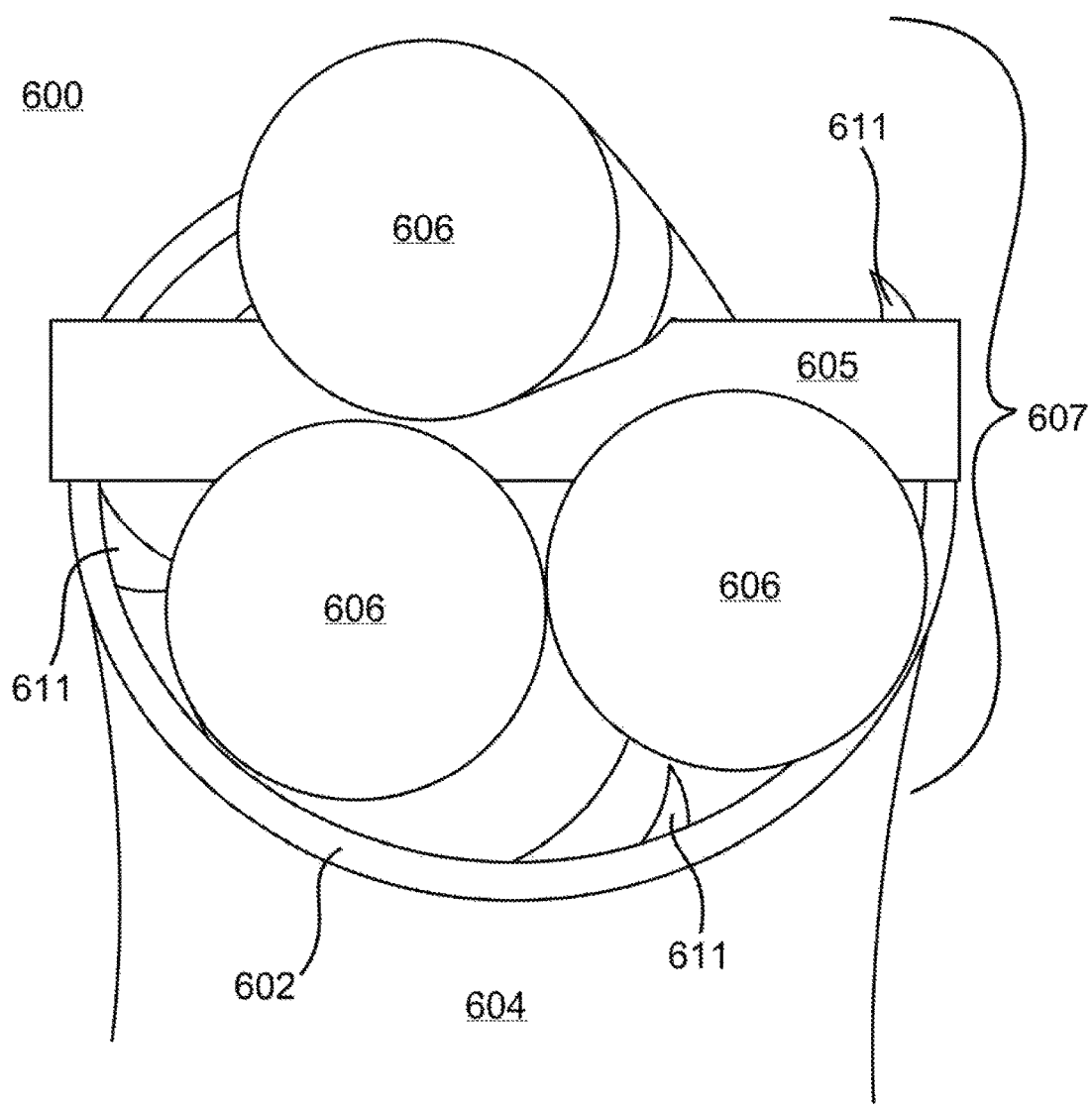
FIG. 6 is a cross-sectional view of strands and a thimble assembly, according to one embodiment.

FIG. 6 is a cross-sectional view of strands 606 and a thimble assembly 600, according to one embodiment. Shown is a cross-section of the arch portion 602 and a segment of the second leg portion 604 of the thimble assembly 600. The barbs 611 may impale the strands 606 of the cord 607 at various locations within the peripheral groove. The strands 606 are woven around the connector 605, with some strands 606 overlapping the periphery of the connector 605 and other strands 606 tucked under the connector 605 in the peripheral groove.

Figure 7:
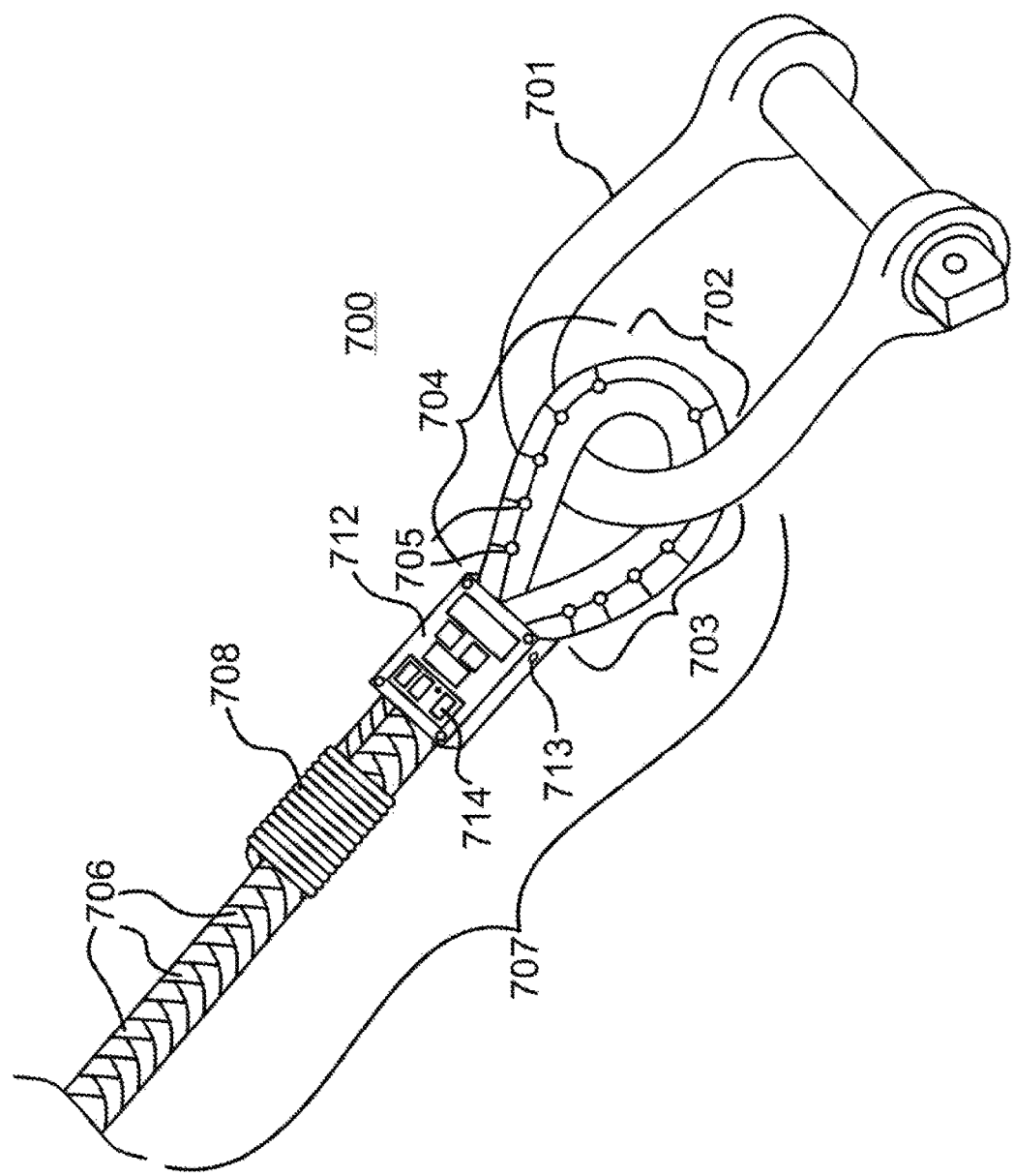
FIG. 7 depicts an embodiment of a thimble assembly with a wireless tension detector.

FIG. 7 depicts an embodiment of a thimble assembly 700 with a wireless tension detector 712. A length of cord 707 may loop around a first leg portion 703, a second leg portion 704 and an arch portion 702 of the thimble assembly 700. The arch portion 702 may connect the first leg portion 703 to the second leg portion 704. A peripheral groove may extend substantially along an outer surface of the first leg portion 703, the second leg portion 704, and the arch portion 702. A plurality of connectors 705 may extend from a first lip of the peripheral groove and connect to a second lip of the peripheral groove. The connectors 705 traverse the peripheral groove across the first leg portion 703, the second leg portion 704, and the arch portion 702. The cord 707 may include a plurality of strands 706 that enclose the connectors 705 by being woven around the connectors 705. A splice 708 may assist in ensuring that the cord 707 stays looped around the first leg portion 703, the second leg portion 704 and the arch portion 702. The thimble assembly 700 may loop around a shackle, according to one embodiment 701.

The cord 707 may be connected to the wireless tension detector 712. In one embodiment, the cord 707 may pass through an aperture in the tension detector 712 such that the tension detector 712 encloses a portion of the cord 707. In one embodiment, the tension detector 712 may be connected to the first and second lips of the peripheral groove. In some embodiments, the tension detector 712 may also be connected to the first leg portion 703 and the second leg portion 704. The tension detector 712 may also include a sensor 713 positioned such that it is facing the cord 707. The sensor 713 may sense radial expansion and contraction of the cord 707 under tension. The tension detector 712 may include a microcontroller comprised of one or more processing units for comparing the radial expansion and contraction of the cord 707 to a predetermined acceptable range. In one embodiment, the microcontroller may include a program memory for comparing tension measurements to the predetermined range. In the event that the radial expansion and/or contraction of the cord 707 are not within the predetermined acceptable range, the tension detector 712 may activate an alert signal to indicate this aberration. The alert signal may be an auditory signal, visual signal, and/or include a vibration or palpation signal feature, according to various embodiments.

In one embodiment, the tension detector 712 may include a display screen 714 that indicates the weight of the load being lifted or pulled. The microcontroller may determine the weight of the load by using a processor to convert the tension being applied to the cord 707 to a numerical weight value. The processor may be connected to an analog to digital converter that converts radial expansion and/or contraction of the cord 707 to a digital signal. In one embodiment, the wireless tension detector 712 may include a lithium battery. In other embodiments, the tension detector 712 may include another wireless power source. In one embodiment, the tension detector 712 may include a transceiver for relaying the alert signal to a portable electronic device. The portable electronic device may be a cellular phone, tablet, computer, or other remote controlled device.

Figure 8:
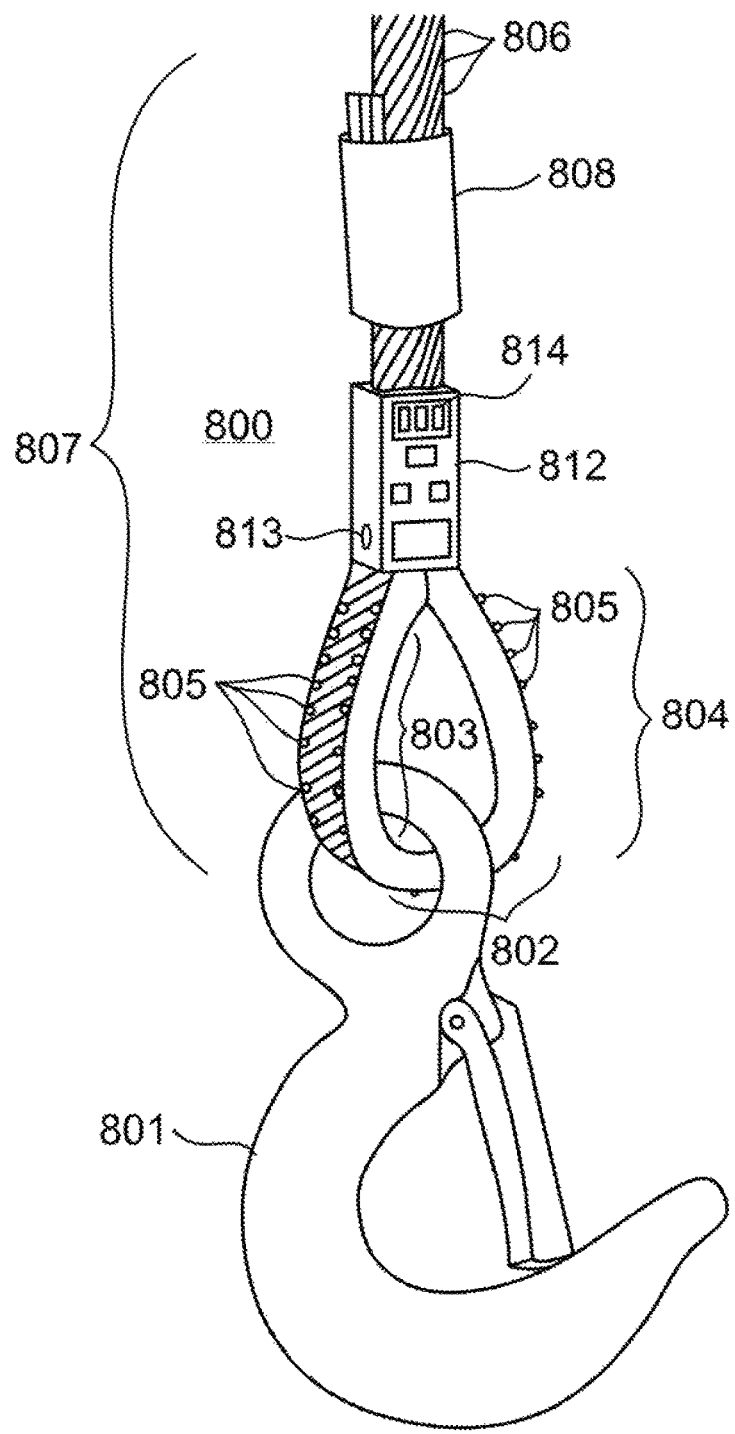
FIG. 8 is an isometric view of a thimble assembly, according to one embodiment, connected to a tension detector.

FIG. 8 is an isometric view of a thimble assembly 800, according to one embodiment, connected to a tension detector 812. The thimble assembly 800 may be connected to a slip hook 801, according to one embodiment, that may attach to a load. The thimble assembly 800 may include a ferrule 808 that may help retain the loop shape of the cord 807 around the first leg portion 803, second loop portion 804, and arch portion 802 of the thimble assembly 800. Strands 806 of cord 807 may be woven around connectors 805. The tension detector 812 includes a sensor 813 for sensing the tension of the cord 807 and a display screen 814 to visually display the weight of the load.

Figure 9:
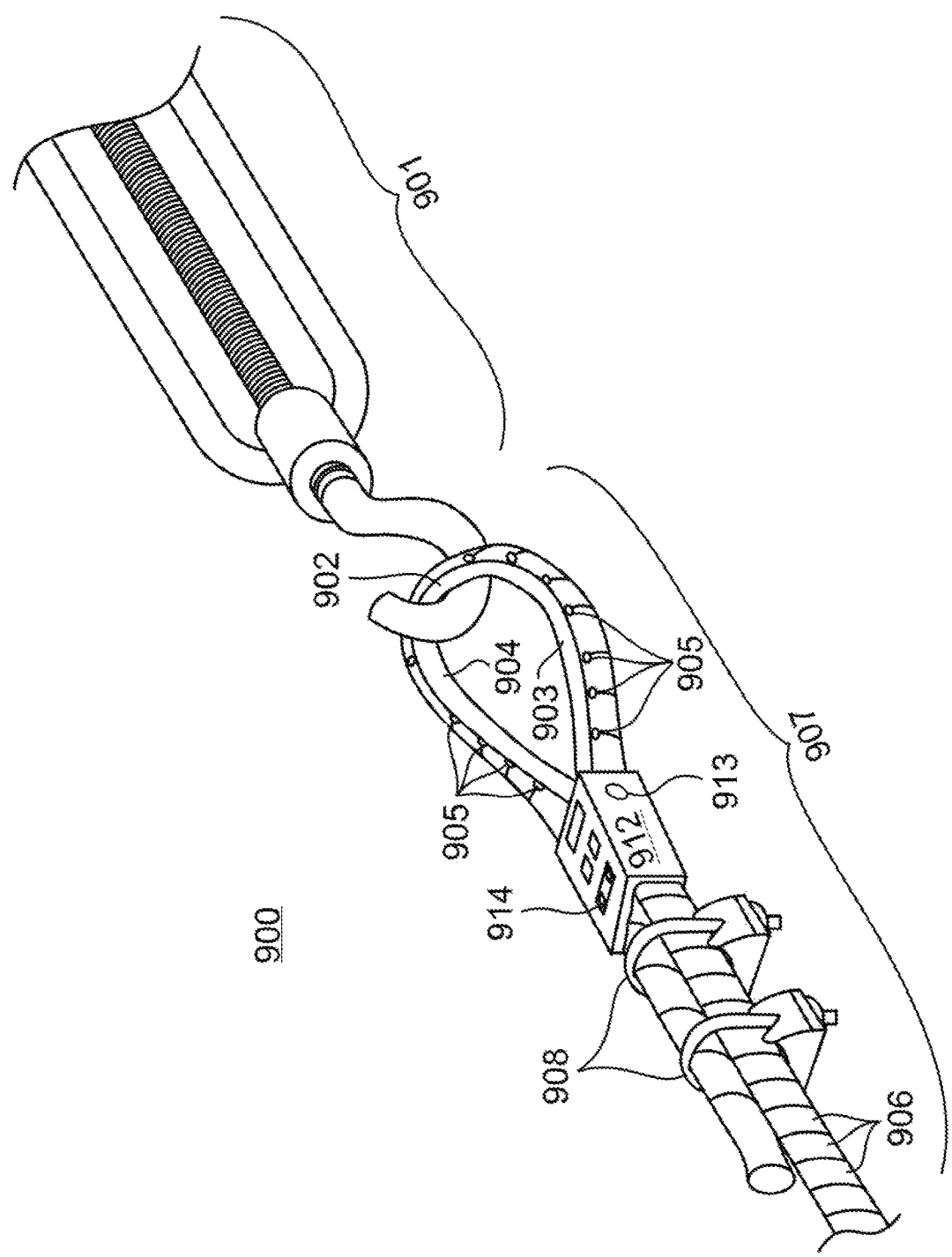
FIG. 9 is an isometric view of an embodiment of a thimble assembly.

FIG. 9 is an isometric view of an embodiment of a thimble assembly 900. The thimble assembly 900 may be attached to a cable tensioner 901, according to one embodiment. A loop may be formed in the cord 907 by weaving strands 906 of the cord 907 around connectors 905 that traverse a peripheral groove of the thimble assembly 900. After looping the cord 907 around a first leg portion 903, a second leg portion 904, and an arch portion 902, of the thimble assembly 900 the loop may be secured using one or more u-bolt pipe clamps 908. Other attachment apparatus may be used to form the loop in the cord 907 such as an embodiment that includes sewn stitches that connect the two halves of the loop together. In another embodiment, the two loop halves may be braided and/or spliced together. One or more bosses with a plurality of bores through which fastening screws tighten may also be used to connect the two loop halves, according to one embodiment. The thimble assembly 900 includes a wireless tension detector 912 with a sensor 913 to detect strain in the cord 907. A display screen 914 may indicate the weight of the load being applied to the cord 907.

FIG. 10A is an isometric view of a thimble assembly 1000 with a wireless tension detector 1012, according to one embodiment. The cord 1007 may extend along the peripheral groove that is formed by the first leg portion 1003, the second leg portion 1004 and the arch portion 1002. The cord 1007 may include a plurality of strands 1006 that are woven around the connectors 1005. The cord 1007 may include one or more materials such as hemp, linen, flax, cellulose, carbon, wool, hair, feathers, cotton, coir, jute, straw, silk, sisal, polymers, nylon, Dyneema®, Kevlar®, rayon, orlon, polypropylene, polyesters, polyethylene, aramids, acrylics, copper, iron, steel, stainless steel, bronze, nichrome, carbon, solder, titanium, zinc, silver, gold, tungsten, or aluminum. The strands 1006 may refer to any suitable fiber, filament, thread, yarn, wire, or any other threadlike material. The thimble assembly 1000 also includes a wireless tension detector 1012 that may comprise a sensor 1013 that senses radial expansion and contraction of the cord 1007 under tension. The weight of the load on the cord 1007 may be displayed on the display screen 1014.

FIG. 10B is an isometric view of the thimble assembly 1000 of FIG. 10A with the cord (1007 of FIG. 10A) removed. The thimble assembly 1000 includes a plurality of connectors 1005 extending from a first lip 1009 of the peripheral groove and connecting to a second lip 1010 of the peripheral groove. The connectors 1005 may extend along the first leg portion 1003, the second leg portion 1004 and the arch portion 1002. In one embodiment, the connectors 1005 may include metal fasteners through which individuals strands (see 1006 of FIG. 10A) of cord (see 1007 of FIG. 10A) may traverse. The peripheral groove of the thimble assembly 1000 may include a plurality of barbs 1011. In one embodiment, the barbs 1011 may be embedded into the strands (see 1006 of FIG. 10A) of cord (see 1007 of FIG. 10A). In various embodiments, the barbs 1011 may include anchoring wires to encircle the individual strands (see 1006 of FIG. 10A). The thimble assembly 1000 may also include a tension detector 1012 connected to the first lip 1009 and second lip 1010 of the peripheral groove comprising a sensor 1013 that senses radial expansion and contraction of the cord (see 1007 of FIG. 10A) under tension. The weight of the load is shown on a display screen 1014 of the tension detector 1012.

The invention claimed is:

1. A thimble assembly, comprising:
an arch portion connecting a first leg portion to a second leg portion;
a peripheral groove extending substantially along an outer surface of the first and second leg portions and the arch portion;
a plurality of connectors extending from a first lip of the peripheral groove and connecting to a second lip of the peripheral groove, wherein the connectors traverse the peripheral groove across the first and second leg portions and the arch portion;
a length of cord comprising a plurality of strands that form at least a partial loop that traverses the peripheral groove;
wherein the connectors are enclosed by the strands such that the strands are woven around the connectors;
wherein the peripheral groove comprises a plurality of barbs embedded into the strands;
a wireless tension detector connected to the first and second lips of the peripheral groove comprising a sensor that senses radial expansion and contraction of the cord under tension;
wherein the wireless tension detector comprises a microcontroller with one or more processing units for comparing the radial expansion and contraction of the cord to a predetermined acceptable range; and
an alert signal to indicate the radial expansion and contraction of the cord is not within the predetermined acceptable range.

2. The thimble assembly of claim 1, wherein the tension detector comprises a lithium battery.

3. The thimble assembly of claim 1, wherein the tension detector comprises an analog to digital converter.

4. The thimble assembly of claim 1, wherein the tension detector comprises a transceiver for relaying the alert signal to a portable electronic device.

5. The thimble assembly of claim 1, wherein the microcontroller comprises a program memory for comparing tension measurements to the predetermined range.

6. The thimble assembly of claim 1, wherein the cord is comprised of hemp, linen, flax, cellulose, carbon, wool, hair, feathers, cotton, coir, jute, straw, silk, sisal, polymers, nylon, Dyneema®, Kevlar®, rayon, orlon, polypropylene polyesters, polyethylene, aramids, acrylics, copper, iron, steel, stainless steel bronze, nichrome, carbon, solder, titanium, zinc, silver, gold, tungsten, or aluminum, or compounds or combinations thereof.

7. The thimble assembly of claim 1, wherein the plurality of barbs are comprised of anchoring wires.

8. The thimble assembly of claim 1, wherein the at least partial loop comprises sewn stitches connecting two halves of the loop together.

9. The thimble assembly of claim 1, wherein the at least partial loop comprises two loop halves that are braided and/or spliced together.

10. The thimble assembly of claim 1, wherein the at least partial loop comprises a ferrule connecting two halves of the loop together.

11. The thimble assembly of claim 1, wherein the thimble comprises one or more bosses with bores through which fastening screws tighten the first leg portion and the second leg portion around the cord.

12. The thimble assembly of claim 1, wherein the connectors comprise metal fasteners through which individual strands of cord may traverse.

13. The thimble assembly of claim 1, wherein the plurality of barbs are randomly spaced apart along the surface of the peripheral groove and comprise a shape that extends among the strands of the cord.

\* \* \* \* \*